Aug. 18, 1964
G. MATSUYAMA
3,145,158
ELECTRODE ASSEMBLY
Filed May 23, 1962
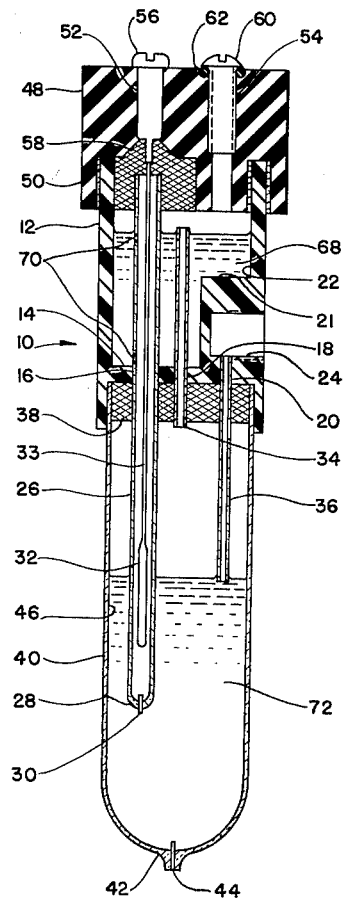
INVENTOR.
GEORGE MATSUYAMA
BY
*Robert M. Taylor, Jr.*
ATTORNEY

United States Patent Office 3,145,158
Patented Aug. 18, 1964

3,145,158
ELECTRODE ASSEMBLY
George Matsuyama, Fullerton, Calif., assignor to Beckman Instruments, Inc., a corporation of California
Filed May 23, 1962, Ser. No. 197,070
2 Claims. (Cl. 204—195)

This invention relates to electrochemical half cells and more particularly relates to a pressurized electrochemical reference half cell having a plurality of liquid junctions.

U.S. Patent No. 2,697,070, issued December 14, 1954, to Edwin P. Arthur and assigned to the assignee of the present application, discloses an electrochemical half cell suitable for use in pressurized streams such are often found, for example, in process industries. As discussed in this patent, it is necessary to maintain a continuous flow of salt solution from the reference half cell to the sample medium under test through a liquid junction. It is therefore necessary to maintain the pressure in the salt solution slightly higher than that of the sample medium under test.

According to the Arthur patent, such a pressure differential is established by providing a sheath around and in spaced relationship with the periphery of the salt bridge tube to form an annular chamber thereabout. The upper end of the sheath is sealed to a suitable portion of the electrode support and the lower end is open and in communication with the sample medium under test. A passageway is formed in the upper end of the salt bridge tube above the level of the salt solution and establishes fluid communication between the interior of the salt bridge tube and the annular chamber formed by the sheath. When the electrode structure is lowered into the sample medium, the sample medium rises in the annular chamber causing the formation of an air bubble in the upper portion of the chamber.

As the depth of submergence increases, the sample medium rises further in the annular chamber compressing the trapped air, the increased pressure being transmitted to the top of the column of the salt solution to maintain the top of this column at a pressure substantially equal to the pressure of the sample medium at the depth of submergence. At the same time there will remain a small pressure differential across the liquid junction as a result of the hydrostatic head of the column of salt solution sufficient to establish a minute flow of electrolyte thereby continuously renewing the liquid junction. As an alternative, an exterior source of pressure can be coupled to the annular chamber and regulated to maintain the proper pressure therein.

While this reference half cell structure is entirely satisfactory in operation, there are various applications where it is undesirable to introduce chloride ions into the process stream. For example, when testing for chloride ion in a sample stream, the introduction of chloride ions from the reference half cell would render any measurements meaningless. In other process operations, such as the manufacture of ammonium nitrate, it is undesirable to introduce chloride ions into the sample stream because of the explosive hazard involved.

According to the present invention, it has now been found that a pressurized reference half cell may be provided which introduces no chloride ions into the medium under test. This half cell relies on the presence of two different electrolytes and two liquid junctions to isolate the primary electrolyte, generally a chloride salt solution, from the medium being tested. The structure enables equal pressures to be established on the two electrolytes so that the pressure differentials caused by their respective hydrostatic heads insure a pressure drop across the liquid junctions sufficient to maintain a flow of electrolyte through them.

It is therefore a primary object of the present invention to provide a pressurized electrochemical half cell in which the salt solution surrounding the reference electrode is prevented from contaminating the medium under test.

It is also an object of the present invention to provide a pressurized electrochemical reference half cell having a plurality of liquid junctions.

It is another object of the present invention to provide a pressurized electrochemical reference half cell including a silver-silver chloride electrode surrounded by a chloride electrolyte and a second electrolyte for preventing chloride ions from contaminating the medium under test.

These and further objects and advantages of the invention will become more apparent upon reference to the following specification and claims and appended drawing wherein:

FIG. 1 is an elevation view, partly in section, of the present invention.

Referring now to FIG. 1, the half cell assembly of the present invention includes a body portion, generally indicated at 10, preferably formed of an epoxy resin or other suitable material. The body portion 10 has an annular wall 12 and a base 14, the annular wall 12 extending on either side of the base 14. The base 14 is provided with annular holes or passages 16, 18 and 20. The annular wall 12 is provided with a thickened portion 21 which projects into the interior of the body and, together with the wall 12 and base 14, forms a chamber 22. The projection 21 is provided with a passageway 24 that communicates with the passage 20 in the base 14.

A salt bridge tube 26, preferably of glass, is positioned in the passageway 16 and is provided with an open upper end and a lower wall 28 in which is provided any suitable liquid junction. As shown, this liquid junction is illustrated as a palladium wire extending through a minute opening of the wall 28. A silver-silver chloride reference electrode 32 of any type well known to those skilled in the art is suspended in the tube 26 by a lead wire 33. If desired, the silver-silver chloride reference electrode could be replaced by a calomel or other suitable electrode.

A second glass tube 34, open at both ends, is inserted into the passageway 18 in the base 14, and a third glass tube 36, also open at both ends, is inserted into the passageway 20. The glass tubes 26, 34 and 36 are maintained in position by a body of cement 38 of any suitable kind. The cement 38 also serves to form a bond between the portion of the wall 12 of the body 10 which extends below the base 14 and the upper end of a fourth glass tube 40. As was the case with the tube 26, the tube 40 is a salt bridge tube and is provided at its lower end with a wall 42 and a suitable liquid junction 44 which, as illustrated, is also a palladium wire.

The assembly is provided with a cap 48 of rubber or a suitable plastic material having an annular skirt 50 which cooperates with the upper end of the wall 12 to close off the top of the chamber 22. The cap 48 is provided with two passageways 52 and 54. The first of these passageways 52 is closed by means of an electrical terminal 56 which is connected to the wire 33 supporting the silver-silver chloride reference electrode 32. A body of cement 58 serves to form a structural bond between the skirt 50 and the upper end of the annular wall 12. Additional cement is provided to seal the passageway 52 and to maintain proper spacing between the lead wire 33 and the tube 26. The passageway 54 serves as a fill hole for the chamber 22 and can be sealingly closed by means of a suitable screw or plug 60 and elastic O-ring 62. Other suitable means of sealing passageway 54 may, of course, be used.

A primary electrolyte 68, such as 4M potassium chloride saturated with silver chloride, is poured through the passageway 54 to partially fill the chamber 22. The chamber is filled up to a predetermined maximum level, which is just below the upper end of the tube 34 so that electrolyte is prevented from flowing down through the tube 34 into the salt bridge tube 40. The electrolyte 68 is also above a plurality of vent holes 70 in the upper end of the tube 26, so that the tube 26 is filled with the electrolyte 68. If desired, the tube 26 may be made to terminate flush with the base 14 and provided with an open upper end instead of the holes 70. A secondary electrolyte 72 having at least one polarity of its ions of different composition than the corresponding polarity ions of the electrolyte 68, such as a potassium nitrate solution, is supplied to the chamber 46 through the passageway 24 and tube 36 up to a predetermined maximum level which is just below the bottom of tube 34 so that electrolyte 72 cannot be pumped into the upper chamber 22 during pressurizing of the cell. The electrolyte, as shown in the drawing, is also somewhat above the liquid junction 30 of the tube 26.

In operation, the electrode is pressurized to a pressure slightly greater than that of the sample through the passageway 24. This pressure may be applied in a variety of ways. For example, a sheath similar to the sheath taught in Patent No. 2,697,070 may be provided around the body of the electrode assembly and attached in any suitable fashion to the body portion 12 above the passageway 24. As was the case in the aforementioned patent, submersion of the electrode assembly causes an air bubble to be trapped in the upper portion of the annular chamber formed by the sheath. This air pressure is communicated to the interior of the electrode assembly through the passageway 24 and the glass tube 36. Pressure may also be applied by the use of an external pressurized gas supply which could be connected to the passageway 24. Pressure may also be supplied by delivering further secondary electrolyte to the chamber 46, resulting in the compression of air trapped in this chamber and in the chamber 22.

When the pressure is applied by whatever means chosen to the passageway 24 and the tube 36, the pressure in the two chambers 46 and 22 is equalized by the pressure equalizing tube 18 whose upper end extends above the upper surface of the primary electrolyte 68. Because the level of the primary electrolyte is above that of the secondary electrolyte, primary electrolyte is forced through the liquid junction 30 to establish ionic communication between the electrolyte 68 surrounding the reference electrode 32 and the secondary electrolyte 72. Because of the hydrostatic head of the secondary electrolyte 72, secondary electrolyte is forced through the liquid junction 44 making ionic communication between this electrolyte and the sample solution. The liquid junction 30 should have a low volume flow to minimize contamination of secondary electrolyte with primary electrolyte but should have a high linear flow to minimize the liquid junction potential. The palladium wire illustrated is suitable for this purpose. In this manner, a completely satisfactory electrochemical path is established, without the introduction of chloride ions into the sample medium.

As can be seen from the foregoing description, a pressurized electrochemical reference half cell has been provided which prevents contamination of the sample medium with chloride ions. This is accomplished by isolating the chloride salt solution which surrounds the silver-silver chloride reference electrode by means of a secondary electrode. A pair of liquid junctions provide ionic connections between the primary electrode and the secondary electrode and between the secondary electrode and the sample medium.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. In an electrochemical testing apparatus, the combination comprising:
   a first salt bridge tube adapted to hold a predetermined maximum level of a first salt solution, said first salt bridge tube having a lower end portion submergible in a medium to be tested, said lower end portion including liquid-junction means adapted to discharge a minute stream of said first salt solution from within said tube into said sample medium;
   a second salt bridge tube adapted to hold a predetermined maximum level of a second salt solution having at least one polarity of its ions of different composition than the corresponding polarity ions of said first salt solution, said second salt bridge tube having a lower end portion, said lower end portion having liquid-junction means adapted to discharge a minute stream of said second salt solution;
   means mounting said lower end portion of said second salt bridge tube in said first salt bridge tube and in sealing relationship therewith;
   first means establishing fluid communication between the interior of said first salt bridge tube and the interior of said second salt bridge tube, said first means having a lower end disposed in said first salt bridge tube above said predetermined maximum level of said first salt solution and an upper end above said predetermined maximum level of said second salt solution; and
   second means establishing fluid communication between the exterior and the interior of said first salt bridge tube, said second means having an open end disposed in said first salt bridge tube at a position below said lower end of said first fluid communication establishing means.

2. In an electrochemical testing apparatus, the combination comprising:
   a first salt bridge tube adapted to hold a predetermined maximum level of a first salt solution, said first salt bridge tube having a lower end portion submergible in a medium to be tested, said lower end portion including liquid-junction means adapted to discharge a minute stream of said first salt solution from within said tube into said sample medium;
   a second salt bridge tube adapted to hold a predetermined maximum level of a second salt solution having at least one polarity of its ions of different composition than the corresponding polarity ions of said first salt solution, said second salt bridge tube having an upper end portion and a lower end portion, said upper end portion having an opening therein, said lower end portion having liquid-junction means adapted to discharge a minute stream of said second salt solution;
   means mounting said lower end portion of said second salt bridge tube in said first salt bridge tube and in sealing relationship therewith;

means surrounding said upper end portion of said second salt bridge tube providing a chamber therein for holding a body of said second salt solution having the same level as said predetermined maximum level of said second salt solution in said second salt bridge tube, said chamber being adjacent to said first salt bridge tube;

first means establishing fluid communication between the interior of said first salt bridge tube and said chamber, said first means having an upper end above said opening in said second salt bridge tube and above said level of said second salt solution in said chamber and a lower end disposed in said first salt bridge tube above said predetermined maximum level of said first salt solution; and second means establishing fluid communication between the exterior and the interior of said first salt bridge tube, said second means having an open end disposed in said first salt bridge tube at a position below said lower end of said first fluid communication establishing means.

References Cited in the file of this patent
UNITED STATES PATENTS

| | | |
|---|---|---|
| 1,779,232 | Handforth | Oct. 21, 1930 |
| 2,697,070 | Arthur | Dec. 14, 1954 |
| 2,846,386 | Ingruber | Aug. 5, 1958 |
| 2,930,967 | Laird et al. | Mar. 29, 1960 |
| 3,028,317 | Wilson et al. | Apr. 3, 1962 |
| 3,103,480 | Watanabe et al. | Sept. 10, 1963 |

OTHER REFERENCES

Mack et al.: "Lab. Manual of Phy. Chem.," (1934), page 250.

Krefield, German Application, Serial No. F9115, printed September 15, 1955 (Kl 421, G 305).